United States Patent
Babb et al.

(10) Patent No.: US 6,506,983 B1
(45) Date of Patent: *Jan. 14, 2003

(54) ALGORITHMIC COMPENSATION SYSTEM AND METHOD THEREFOR FOR A TOUCH SENSOR PANEL

(75) Inventors: Joe Henry Babb; Geoffrey D. Wilson, both of Knoxville, TN (US)

(73) Assignee: ELO TouchSystems, Inc., Fremont, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/263,694

(22) Filed: Mar. 5, 1999

Related U.S. Application Data

(63) Continuation of application No. 08/616,851, filed on Mar. 15, 1996, now Pat. No. 5,940,065.

(51) Int. Cl.[7] .................................................. G09G 5/00
(52) U.S. Cl. ........................... 178/18.01; 178/18.02; 178/18.03
(58) Field of Search ............................ 178/18.01, 18.02, 178/18.03, 18.04, 18.05, 18.06, 18.07; 345/173, 174, 177, 178, 179

(56) References Cited

U.S. PATENT DOCUMENTS

| | | | |
|---|---|---|---|
| 2,704,305 A | 3/1955 | McLaughlin et al. | 178/19 |
| 3,106,707 A | 10/1963 | Thompson | 178/19 |
| 3,622,105 A | 11/1971 | Buchhotz et al. | 178/18 |
| 3,699,439 A | 10/1972 | Turner | 324/71 |
| 3,798,370 A | 3/1974 | Bari et al. | 345/173 |
| 4,071,691 A | 1/1978 | Pepper, Jr. | 178/19 |
| 4,080,514 A | 3/1978 | Pobgee | 178/18 |
| 4,129,747 A | 12/1978 | Pepper, Jr. | 178/19 |
| 4,198,539 A | 4/1980 | Pepper, Jr. | 178/18 |
| 4,213,005 A | 7/1980 | Cameron | 178/18 |
| 4,214,122 A | 7/1980 | Kley | 178/18 |
| 4,293,734 A | 10/1981 | Pepper, Jr. | 178/18 |
| 4,302,011 A | 11/1981 | Pepper, Jr. | 273/85 |
| 4,371,746 A | 2/1983 | Pepper, Jr. | 178/18 |
| 4,430,917 A | 2/1984 | Pepper, Jr. | 84/101 |
| 4,622,437 A | 11/1986 | Bloom et al. | |
| 4,623,757 A | 11/1986 | Marino | 178/18 |
| 4,625,075 A | 11/1986 | Jaeger | 178/18 |
| 4,631,355 A | 12/1986 | Frederico et al. | 178/18 |
| 4,649,232 A | 3/1987 | Nakamura et al. | 178/18 |
| 4,650,926 A | 3/1987 | Nakamura et al. | 178/18 |
| 4,661,655 A | 4/1987 | Gibson et al. | 178/18 |
| 4,678,869 A | 7/1987 | Kable | 178/19 |
| 4,679,241 A | 7/1987 | Lukis | 382/13 |
| 4,698,460 A | 10/1987 | Krein et al. | 178/19 |
| 4,710,595 A | 12/1987 | Kimura | 178/18 |
| 4,752,655 A | 6/1988 | Tajiri et al. | 178/18 |

(List continued on next page.)

FOREIGN PATENT DOCUMENTS

| | | |
|---|---|---|
| EP | 0 571 226 A1 | 11/1993 |
| EP | 0 631 256 A2 | 12/1994 |
| JP | 59-041090 | 3/1984 |
| JP | 62-100827 | 5/1987 |
| JP | 1-232415 | 9/1989 |
| JP | 7-49472 | 2/1995 |

*Primary Examiner*—Vijay Shankar
(74) *Attorney, Agent, or Firm*—Milde & Hoffberg LLP

(57) ABSTRACT

A general method is described for producing an inexpensive touchscreen system that provides accurate positional information and compensates for manufacturing variations without complicated sensor arrangements. Utilizing a set of sensed signals that are unique to each location on the touchscreen sensor, equations for X and Y are derived via curve fitting methods. The coefficients of the equations are stored with the sensor. During touchscreen operation the coefficients are used to calculate X and Y to the desired accuracy directly and independently.

51 Claims, 11 Drawing Sheets

U.S. PATENT DOCUMENTS

| | | |
|---|---|---|
| 4,788,384 A | 11/1988 | Buere-Dawson et al. ...... 178/18 |
| 4,798,919 A | 1/1989 | Miessler et al. .............. 178/18 |
| 4,806,709 A | 2/1989 | Evans ......................... 178/19 |
| 4,822,957 A | 4/1989 | Talmage et al. .............. 178/18 |
| 4,825,017 A | 4/1989 | Hobara ........................ 178/18 |
| 4,827,084 A | 5/1989 | Yaniv et al. .................. 178/18 |
| 4,837,716 A | 6/1989 | Chia-Hui .................... 364/559 |
| 4,853,493 A | 8/1989 | Schlosser et al. ............. 178/18 |
| 4,996,393 A | 2/1991 | Zalenski et al. ............. 178/19 |
| 5,101,081 A | 3/1992 | Drumm ........................ 178/18 |
| 5,134,689 A | 7/1992 | Murakami et al. ........... 395/143 |
| 5,157,227 A | 10/1992 | McDermott et al. |
| 5,181,030 A | 1/1993 | Itaya et al. ................... 341/20 |
| 5,335,230 A | 8/1994 | Crooks et al. ................ 371/13 |
| 5,359,156 A | 10/1994 | Chan et al. ................... 178/19 |
| 5,365,461 A | 11/1994 | Stein et al. ................... 364/95 |
| 5,376,948 A | 12/1994 | Roberts |
| 5,386,219 A | 1/1995 | Greanias et al. ............ 345/174 |
| 5,392,035 A | 2/1995 | Yoshikawa ..................... 349/5 |
| 5,410,329 A | 4/1995 | Tagawa et al. ............. 345/104 |
| 5,412,161 A | 5/1995 | Crooks et al. |
| 5,438,168 A | 8/1995 | Wolfe et al. .................. 178/20 |
| 5,563,381 A | 10/1996 | Crooks et al. |
| 5,563,632 A | 10/1996 | Roberts |
| 5,686,705 A | 11/1997 | Conroy et al. ................ 178/19 |
| 5,940,065 A * | 8/1999 | Babb et al. ................. 345/178 |
| 5,943,044 A * | 8/1999 | Martinelli et al. .......... 345/174 |

* cited by examiner

ALGORITHMIC COMPENSATION SYSTEM AND METHOD THEREFOR FOR A TOUCH SENSOR PANEL

The present application is a Continuation application of Ser. No. 08/616,851, filed on Mar. 15, 1996 now U.S. Pat. No. 5,940,065.

FIELD OF THE INVENTION

The present invention relates to a method and system for deriving or employing a mapping relation for determining coordinate positions of a physical effect on a substrate from a plurality of detectors. More particularly, the invention relates to a touchscreen system with a plurality of corner detectors, applying the mapping relation to accurately determine a coordinate position of a touch from the detector outputs, regardless of configuration and possible manufacturing variations.

BACKGROUND OF THE INVENTION

The functionality of a touchscreen system (typically including a touchscreen and an electronic controller) requires that there exist a relationship between the physical location of a touch, e.g. by a person's finger, and some coordinate schema. In general, the coordinate system of choice is a two-dimensional Cartesian system with orthogonal horizontal (X) and vertical (Y) axes. The system accuracy is defined as the error between the physical location of the touch and the location reported by the touchscreen/controller. Typically, system accuracy is expressed as a percentage of the touchscreen dimensions.

A touchscreen system may be considered to have two classes of error, (i) those resulting from the design and implementation of the coordinate transformation method (systematic error), and (ii) those resulting from random unit to unit errors within a given class of sensors (manufacturing variance).

Known conductive touchscreen systems have a transparent substrate with a conductive film, e.g., indium tin oxide (ITO) deposited thereon, which is subject to variation in surface conductivity, i.e., ±5% or ±10%. A particular additional source of errors in systems employing such substrates is the non-linear variation in sensed probe injection current inherent in the configuration of a generally rectangular substrate with electrodes at the corners. This results in a non-uniform current density at various portions of the substrate, especially near the electrodes. Because of the gross non-linearities, it is generally considered undesirable to attempt to perform a piecewise linear compensation, i.e., directly compensate for repositionable electrode position based on a lookup table calibration procedure. Prior methods have therefore sought to include physical linearization structures, such as complex current injection electrodes, in order to reduce the non-uniformity in surface current density, and to linearize the potentials on the substrate. These complex linearizing structures often include complex conductive patterns, diodes or transistors to redistribute or control the redistribution of currents. Still other methods have sought to apply a mathematical algorithm to compensate for the expected distortions due to the rectangular physical configuration.

The coordinate transformation methods employed in prior systems may be categorized into two basic technologies, herein called electromechanical and modeling, each based on a ratiometric approach, whereby there is an assumed mathematical relationship between measured data and a physical location on the surface of the sensor. Typical distortion of the coordinate values in X and Y of an uncompensated rectangular conductive substrate is shown in FIG. 1

Lookup tables provide an addressable storage for correction coefficients, and have been proposed for use in correcting the output of touch position sensors based on a number of technologies. These systems receive an address, i.e., a pair of X and Y values, which corresponds to an uncorrected coordinate, and output data which is used to compensate for an expected error and produce a corrected coordinate, generally in the same coordinate space as the uncorrected coordinate. Proposals for such schemes range from zero order to polynomial corrections. See, U.S. Pat. No. 4,678,869, incorporated herein by reference. In general, the uncorrected coordinate input to the proposed lookup table is initially linearized, i.e., by physical means or by algorithmic means, as discussed below, so that the lookup table operates in a linearized space. Lookup table data values derived from a calibration procedure thus directly correspond to the calibration data coordinate values, and define calibration regions.

Electromechanical Methods

There is a class of systematic error compensating methods comprising electromechanical modifications to the touchscreen system, seeking to approximate an orthogonal grid of electrical potentials from the characteristics shown in FIG. 1. There are four basic methods (summarized below) in this category. The design of such electromechanical methods addresses the systematic error, described above, for a given class of touchscreen. The nature of these methods often results in a significant current drain on the system and the multiplicity of electrodes and/or resistance patterns leads to a high sensor cost. Further, the management of the corrective methods, e.g. excitation switching, sensing plane selection, electrode selection, etc., mandates an interactive control mechanism that adds to the system cost. To correct unacceptable errors occasioned by manufacturing variances within the given class of touchscreens, additional error correcting methods, Such as table lookup, may be employed for each individual touchscreen.

Bus-Bar Methods

This, the most elementary form of correcting the fundamental distortion characteristics is by creating highly conductive bus bars 3 on opposing axes of the substrate 1 (FIG. 2). Excitation is applied to the bus bars 4 and a conductive coversheet 2 provides for the relocatable electrode. Measurement is made as if the touchscreen were a potentiometer, the position of the "wiper" being the location of the touch, in that plane of excitation. The excitation is then switched to a second set of bus bars in an orthogonal plane (in some cases located on the cover sheet 2) to define the second coordinate. This technique is exemplified by U.S. Pat. No. 3,622,105. The principal drawback to this technology is its current drain. Further, in those cases where the cover sheet is employed for the second excitation plane, any coversheet damage will result in positional location errors.

Multi-Feed Methods

Multi-feed technology, typified by U.S. Pat. No. 5,438,168, employs active control of multiple electrodes 10 located around the periphery of the resistive substrate 11, as shown in FIG. 3. The operation of these systems are generally functionally equivalent to that of bus-bar technology, in that linear voltage gradients are generated for sampling by a cover sheet relocatable position sensor. Since all electrodes 10 are located on one substrate 11, it is unaffected by cover sheet damage. However, it is a high current drain system, and requires a large number of interconnections. Failure or degradation of any of its switching elements 12 results in system errors.

Resistive Pattern Methods

Many known of corrective methods include use of resistive patterns 21 on, or external to, the touchscreen 20, in such a sequence that the resistive gradient of the touchscreen 20 is approximately the same across its surface, as shown in FIG. 4. U.S. Pat. Nos. 3,798,370, 4,293,734, and 4,661,655 typify this technique. These systems have the high current consumption associated with electromechanical methods, and, because of the complexity of the resistive patterns 21, are prone to errors resulting from manufacturing variances.

Modeling

A second category of coordinate generation technique is based on mathematical functions, chosen because of assumed mathematical relationships for a given class of touchscreens. These methods result in X and Y values that require further adjustments or corrections either because of inadequacies in the assumptions or because of manufacturing variations, or both.

One method, described in U.S. Pat. No. 4,631,355 and Federico et al., "17.2: Current Distribution Electrograph" SID 86 Digest, p. 307, relies on an a priori assumption concerning the mathematical distribution for points on a touchscreen. Each plane is extracted by ratiometric methods, and the axial "astigmatism" of each plane, as exemplified in FIG. 1, is then linearized by the use of a second order polynomial equation whose coefficients are empirically derived. U.S. Pat. No. 4,631,355 notes that manufacturing variation errors on the order of 5% are usual, but does not compensate for them, and therefore would need to be corrected for by additional techniques in order to provide an accurate touch position sensing method. Therefore, Federico et al., "17.2: Current Distribution Electrograph" SID 86 Digest, proposes storing calibration data in a lookup table, for operation separately from the algorithmic compensation system and as a subsequent step to correct the sensor output.

U.S. Pat. No. 4,806,709 is predicated on the assumption of a linear relationship between signals at an electrode located on the conductive surface and the distance between that electrode and the touch location. Using this assumption, the signal from each electrode is employed in an equation that describes the arc of a circle with its origin at the electrode, with a second equation that defines the touch location as the intersection of two or more of such arcs. An implementation of such an approach would have two principal sources of error, (a) non-linearities in the assumed signal/distance relationship, measured data confirming such non-linearities, and/or manufacturing variances which would lead to an error in the calculation of each arc radius, and (b) the classic problem of positional error caused by the difficulty in resolving the angles of intercept as the arcs approach tangency.

SUMMARY OF THE INVENTION

The present invention provides a system for providing an accurately determined coordinate position of a physical effect on a medium with a plurality of sensors, each detecting the effect through the medium. The plurality of sensors are mapped to the output coordinate system through a mapping relation, which requires no predetermined relationship of the sensed effects and the coordinate system. In general, the form of the mapping relation is an equation, e.g., a polynomial consisting of various terms, with the coefficients of the mapping equation determined for each example of the integrated sensor, to account for individual manufacturing variations as well as the systematic relationship of the detectors to the coordinate output.

In a preferred embodiment, a touchscreen is provided, having a conductive rectangular substrate with electrodes at each corner of the substrate. An electrical field is induced or effected by proximity of an element, and the electrical field is measured by the plurality of electrodes. Generally, due to the conductive nature of the substrate, a current distribution between the detectors will be measured, the distribution varying with a position of the element with respect to the substrate. Thus, for each position of the element, a unique set of detector outputs will be obtained. A mapping equation is evaluated to map the detector outputs to a desired position coordinate system. Generally, the desired position coordinate system is a Cartesian coordinate system, although other mappings may be provided.

During a manufacturing procedure, each sensor substrate is individually mapped, using a plurality of test points. These test points need not have any particular positions with respect to the substrate, although a relatively large number are preferably provided, dispersed across the surface of the substrate, or at least that portion which is expected to be used. The physical position of each test point is accurately recorded, along with the detector outputs at that test point. A mapping equation is then defined, based on the recorded data, which optimizes an error of the output coordinate positions with respect to the detector outputs. For example, a least mean square curve fitting may be employed to determine a plurality of coefficients of an equation.

In a preferred embodiment, the form of the equation is predetermined, for sensor systems of a given type, meaning that each sensor system of a given type is provided in conjunction with a set of coefficients, which are evaluated with a mapping equation of the same general form. Of course, a predetermined mapping equation is not required for all embodiments, in which case the format of the mapping equation must be specified.

A particular characteristic of the present invention is that, without need for physical or algorithmic prelinearization, the mapping equation is capable of producing accurate coordinate position output from the detector outputs in a single expression. Therefore, the data stored in memory is not in the form of an addressable error lookup table, but rather of the form of data describing a mapping for a set of sensor data coordinates to touch coordinates, without any presumed linear relationship. Preferably, there are at least three detector outputs for mapping to two coordinate axes. Thus, as a characteristic of one embodiment of the invention, the mapping relation has inputs greater in number, and having no one-to-one correspondence to the outputs.

According to a preferred embodiment, a conductive touchscreen is provided which measures the effect of a touch position on a plurality of electrodes to determine a position of the touch. The touch may inject a current, e.g., in a resistive touchscreen, or perturb an electrical field, e.g., a capacitive touchscreen. In most applications, a rectangular substrate having four corner electrodes is provided, although other shapes and electrode arrangements are possible.

In another embodiment, the physical effect is a localized force applied to a stiff, or force transmissive element. The element is suspended by a plurality of force detectors, which may be resistive, piezoelectric, inductive, optical, acoustic, or employ other known sensor types. The outputs of the force transducer detectors are mapped to a coordinate location of the force application. This mapping accounts for flexion of the element, configuration of the element, force distribution at the detector locations, and manufacturing variation in the element and detectors.

In principal, therefore, the medium conducts a physical effect, which is sensed at a plurality of sensing locations. In many instances, there will be a monotonic relation of distance from the location of the effect to each detector and the detector output, although this is not required. However, it is generally required that each set of detector outputs uniquely correspond to a location. Further, it is preferable that there be a continuous first derivative of the detector responses with respect to location of the effect, allowing a continuous mapping function to be employed. The physical effect need not be electrical or force, and may be magnetic, vibrational or acoustic, or another type of effect.

The present invention does not rely on a presumption of ratiometric sensing of effects.

A number of proposed methods rely on uniformity of a conductive media, to detect an amplitude, distribution or delay of a signal, and are thus subject to errors directly resulting from a failure to meet this criteria. Therefore, according to one aspect of the invention, empirically observed data for the media and system incorporating the media is obtained, in order to define an actual mapping relation of the detector outputs and the location of the effect. This data may be processed to various levels. Preferably, an efficient model is employed, with a limited number of stored coefficients of a polynomial curve-fitting equation. The coefficients are preferably derived by a least mean squares fit. The specific terms used in the polynomial equation may be selected based on a sensitivity analysis, preferably with only terms necessary to achieve a given accuracy employed. In general, because the system is a mapping system rather than a linearization followed by calibration system, the stored coefficients do not individually correspond to regions, locations or coordinates of the medium.

One method of limiting the mapping evaluation equation complexity is to define a number of regions of the media, each region being associated with a set of coefficients. In use, the region of the physical effect is estimated, and the set of coefficients corresponding to the estimated region employed to map the detector outputs to the location of the effect. Therefore, while increased coefficient storage is necessary, the complexity of the mapping relation may be reduced and/or the resulting accuracy increased. In general, the estimation of the region will be a simple mapping of boundary regions based on comparisons of detector output data, and therefore there is no need to define an estimated coordinate position of the location of the effect. Typically, four regions are defined for a rectangular substrate medium, each region corresponding to an area around a corner electrode. In the case of the four regions, or quadrants, the region is determined simply by determining the detector with the largest output signal.

In accordance with the present invention, nonlinearities such as the hyperbolic current distribution distortion of a conductive rectangular substrate with corner electrodes, or nonlinearities of substrates having a rectangular or non-rectangular shape with cylindrical, conic, spherical, ellipsoidal or other curvature or non-planar regions may be corrected to map detector outputs to a coordinate location of a touch. Further, in the same mapping process, manufacturing variations such as surface conductivity variations, electrode configuration variations, cover sheet variations, and the like, may also be corrected. Other aspects of the distur bance may also be measured. The mapping relation thus may compensate, in a unified system, for:

(a) The configuration and properties of the medium;
(b) The number, location and characteristics of each of the detectors;
(c) manufacturing variations of the medium and detectors, and other portions of the system.

The present system applies a mapping relation, determined individually for each sensor system, to correct for both nonlinearities and manufacturing variations to provide a high accuracy location coordinate output. Errors due to manufacturing variations such as non-uniform coating thickness, bubbles or scratches in the coating, differences in the connection resistance of the cover sheet or the fixed sensing electrodes, or variations in the characteristics of the interface electronics are included within the mapping relation.

According to the present system, a mapping relation is determined based on a plurality of empirical measurements, which compensate for the overall and actual properties of the sensor system. Further, the generation of the coefficients for the mapping algorithm may performed internally to the controller or on an external system.

Measurement points must generally be spaced less than one half of the spatial Nyquist frequency of significant variations, and these variations must be actually measured. According to one embodiment of the invention, the mapping algorithm may be implemented to compensate for variations which are actually present, without further complexity. Therefore, it is possible to uniquely define the mapping characteristics of an individual sensor system for the required degree of accuracy, and apply an algorithm having the least necessary complexity. For example, where a particular manufacturing variation occurs in one quadrant of a sensor system, a mapping equation applied for that quadrant may have greater complexity than other quadrants. The format of the mapping equation may stored explicitly or implicitly in the stored data.

Because essentially complete mapping may be achieved through application of the algorithm, the present system does not require physical means for controlling the current distributions through the conductive surface, thus allowing a simple substrate configuration with a plurality of corner electrodes, e.g., four corner electrodes of a rectangular panel, to receive electrical signals. The electrical signals, it is noted, may be of constant current, e.g., a DC signal, or of time-varying current waveform having a constant RMS value, e.g., an AC signal. Advantageously, the corner electrodes need not be sequenced or subject to complex time domain analysis; therefore, a simple current source and transconductance amplifiers may be provided. The present system according to the present invention may be used in both resistive and capacitive sensing systems. The present system also allows superposition of different sensing systems, e.g., static and dynamic signals may be simultaneously measured.

Advantageously, the set of mapping relation coefficients are efficiently stored. Further, the scheme of the present system does not assume a ratiometric relationship of the physical effect and the detector outputs, allowing high performance even with non-uniform and non-linear systems.

The computing load associated with typical position determining equations consists of 26 multiply and 20 addition operations to compute both X and Y coordinates, a load well within the capabilities of typical low-cost processors, such as Intel 8051 and derivatives thereof to process within a suitable time-frame. In fact, the system according to the present invention generally has no requirement for any bi-directional interaction between the touchscreen and the remainder of the system, to accomplish the transformation of sensed signals to location coordinates, thus permitting a low-cost embodiment in which the conventional touchscreen controller may be eliminated, the execution of the algorithms being performed by the host computer that also contains the associated application programs. Host processors in systems commonly interfaced with touchscreen sensors, such as Microsoft Windows compatible computers, have sufficient available processing power to evaluate a mapping relation of a touchscreen sensor and execute application programs, without substantial degradation in performance.

The mapping relation information may be stored in a memory device physically associated with the sensor system, or in a separated memory that is used in conjunction with the system. The relatively small number of coefficients necessary allows use of a small memory device, and since the coefficients may be transferred to a local storage of a processor on device initialization, the speed of the memory is not critical. Advantageously, a serial interface EEPROM, physically associated with the interface electronics of a touchscreen with a host processor is employed to store the coefficients. Other memory devices include rotating magnetic media, e.g., floppy disks and the like, and semiconductor memories. While not preferred, it is noted that creation of the mapping equation may be performed subsequent to the manufacturing process, e.g., following device installation on a host system.

As stated above, a preferred method for determining the coefficients for a mapping equation is the well established method of least squares optimization. In this technique, a set of coordinate values for X and Y are given as the desired output from a mapping polynomial equation, which is a function of detector output values. The difference between the value at each point and the value given by the polynomial is squared. This forms a sort of N dimensional bowl shaped surface which has a minimum value at some point in N space. The coefficients of the polynomial are solved in a manner that produces the minimum error for a given data set (an array of detector output values for a set of specific points on the medium with known or determined locations). Solving for the coefficients involves partial differentiation of the squared error term with respect to each coefficient, setting each equation to zero, then solving the resulting N simultaneous equations. While a generic polynomial may be defined which includes one coefficient for each data point, it is preferred to define a simpler equation, having fewer coefficients, and then optimize the coefficients of the simpler equation based on the available data to optimize the error. It is noted that the lowest mean square error is but one optimization technique, and one skilled in the art may optimize differently, if desired.

Where a term of the mapping algorithm equation is found during the design phase of the sensor to have low significance for the entire range of mapping, it may be ignored. Thus, in an embodiment where the sensor system is divided into quadrants, higher order terms may be selectively evaluated or ignored. Thus, where the mapping space is subdivided, terms with low expected significance in any region of the space may be ignored for that region, allowing reduced processing to produce a corrected output while maintaining accuracy Therefore, one aspect of the present invention provides algorithmic mapping of electrode inputs based on relocatable probe position by means of a mapping formula or set of formulas, derived from an individualized measurement procedure.

In one embodiment, a mapping region defined by the algorithm is not coincident with, and larger than a measurement region, defined by a particular measured point and the arrangement of the other measured points. Preferably, the mapping algorithm according to the present invention does not exceed second or third order in complexity, although fourth or higher order mapping schemes may be provided within the present scope of invention. It is noted that the mapping relation for each coordinate axis need not be of the same form, especially where the substrate is asymmetric.

In addition to its simplicity and low manufacturing costs, the power requirements for this touchscreen system are minimal, some three orders of magnitude less than conventional resistive touchscreens, thus facilitating its application in battery powered systems.

As stated above, the system according to the present invention is not limited to electrical sensing methods.

OBJECTS OF THE INVENTION

It is therefore an object of the invention to provide a method for deriving a mapping equation for determining coordinate positions from a plurality of input values, the input values corresponding to signals sensed by a plurality of condition detectors, associated with a medium having a surface, which conducts signals associated with the condition, the signals varying in relationship with a coordinate position of a condition-effecting element with respect to the surface, comprising the steps of providing measured input values produced at a plurality of determined positions of the condition-effecting element; and processing the measured input values in conjunction with the associated determined positions to produce a set of coefficients of a mapping equation comprising a plurality of terms, each term being a coefficient or a mathematical function of at least one coefficient and at least one input value, the mapping equation relating the input values with a coordinate of a position of the condition-effecting element.

It is also an object of the invention to provide a method for mapping a plurality of detector outputs to coordinate positions, comprising the steps of providing a medium for conducting a physical effect, having at least three detectors for detecting a conducted portion of the physical effect at different positions on the medium; measuring, with the at least three detectors, portions of the physical effect conducted through the medium from an origin of the physical effect; and mapping the measured physical effects from the at least three detectors to a coordinate position of the origin of the physical effect, employing a mapping equation derived for the medium and detectors from empirical data, to account for an actual configuration of the medium and detectors.

A still further object of the invention is to provide a method for deriving a mapping relation for determining coordinate positions with respect to a medium having a surface, from a plurality of input values, the input values corresponding to signals sensed by a plurality of condition detectors, each being associated with the medium, the medium being conductive for signals associated with the condition, the signals varying in relationship with a coordinate position of a condition-effecting element with respect to the surface, comprising the steps of providing measured input values produced at a plurality of determined positions of the condition-effecting element; and processing the measured input values in conjunction with the associated determined positions to derive a mapping relation for relating the input values with a coordinate of a position of the condition-effecting element, said mapping relation operating to directly map the input values to coordinate positions substantially without an intermediate representation of an uncorrected coordinate position.

It is a still further object of the invention to provide a position determining system, comprising a medium, having a surface, transmitting physical effects from one portion to another portion; a plurality of spaced detectors for sensing transmitted physical effects in said medium and each producing a detector output; and a memory for storing a plurality of values of information, corresponding to a mapping relationship of said detector outputs at a plurality of determined positions, with respect to said surface, of a physical effect applied to said medium.

It is another object according to the present invention to provide an apparatus for mapping a plurality of detector outputs to coordinate positions, comprising a medium, conducting a physical effect; at least three detectors, at different positions on said medium, each detecting a conducted portion of said physical effect; and a memory for storing information relating to a mapping of a localized physical effect detected at said at least three detectors to a coordinate position of said location of the physical effect, said stored information including information derived for said medium and detectors from empirical observation, to account for an actual configuration of said medium and detectors.

It is an additional object according to the present invention to provide a position determining system, comprising a medium, having a surface, transmitting physical effects from one portion to another portion; a plurality of spaced detectors for sensing transmitted physical effects in said medium and each producing a detector output; and a memory for storing a plurality of values of information, corresponding to a mapping relationship of said detector outputs at a plurality of determined positions, with respect to said surface, of a physical effect applied to said medium, said mapping relationship being selected from the group consisting of:

(a) a mapping equation comprising a plurality of terms, each term being a coefficient or a mathematical function of at least one coefficient and a value associated with at least one detector output, the mapping equation relating the detector outputs with a position of the applied physical effect;

(b) a mapping function operating to directly map the detector outputs to corrected coordinate positions of physical effects substantially without an intermediate representation of an uncorrected coordinate position; and (c) a mapping function operating to map a localized physical effect detected by at least three detectors to a coordinate position of said location of the physical effect, said stored information including information derived for said medium and detectors from empirical observation, to account for an actual configuration of said medium and detectors.

These and other objects will become apparent. For a full understanding of the present invention, reference should now be made to the following detailed description of the preferred embodiments of the invention as illustrated in the accompanying drawings.

BRIEF DESCRIPTION OF THE DRAWINGS

The preferred embodiments of the invention will be shown by way of drawings of the Figures, in which.

DETAILED DESCRIPTION OF THE PREFERRED EMBODIMENTS

Figure 1:
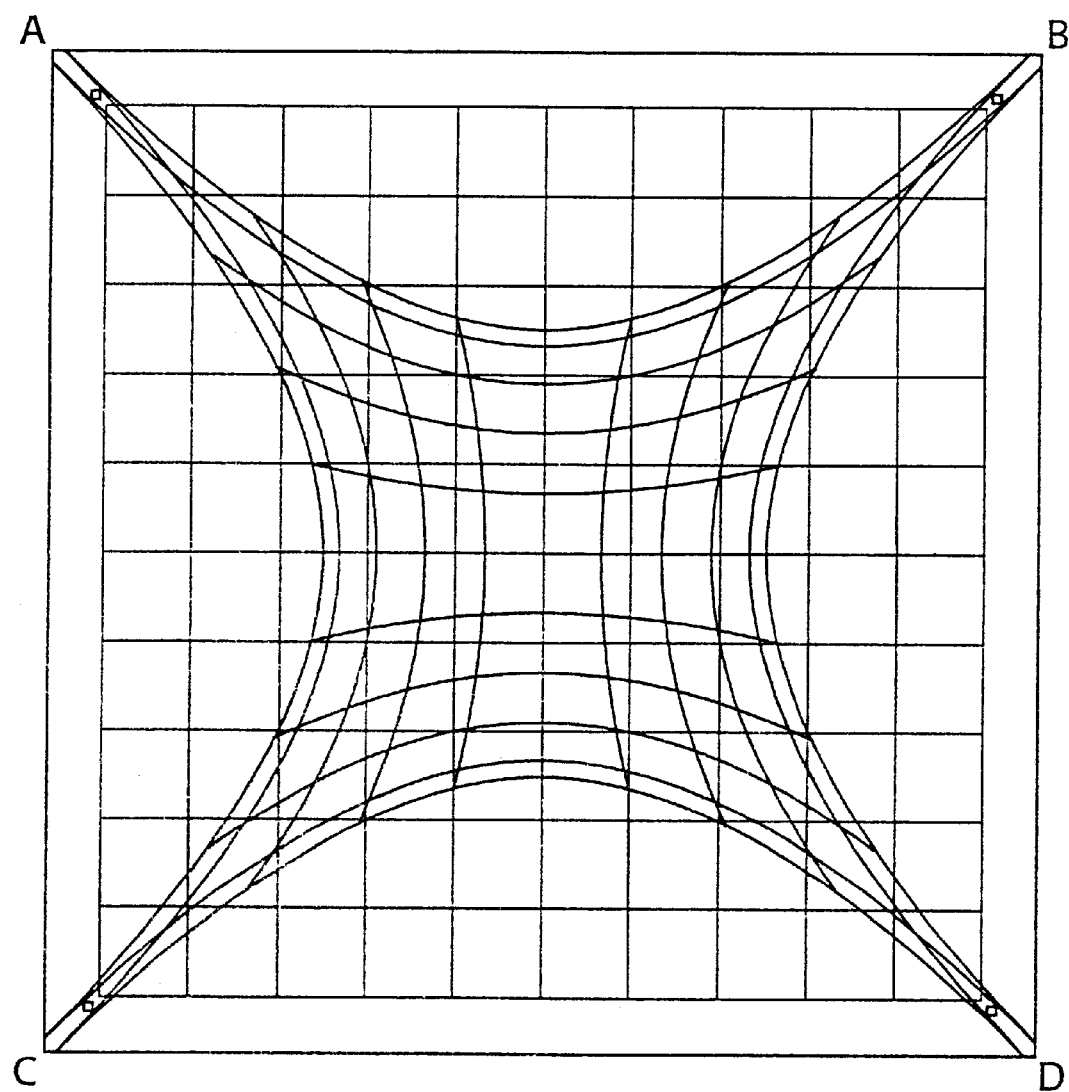
FIG. 1 of the prior art shows a map of X and Y coordinates resulting from an assumption of a ratiometric relationship on an uncorrected surface.
Figure 2:
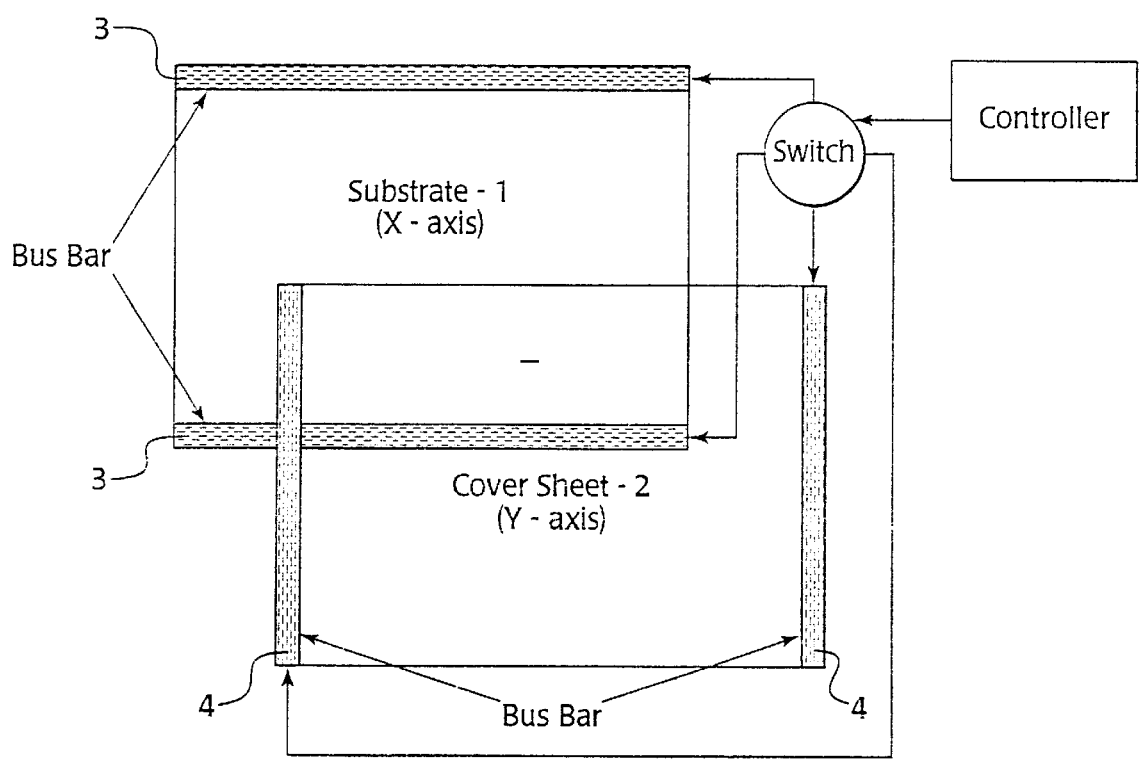
FIG. 2 of the prior art shows a bus bar system, generating a relatively linear gradient as you move from one to the other on application of a voltage potential between bus bars on either axis.
Figure 3:
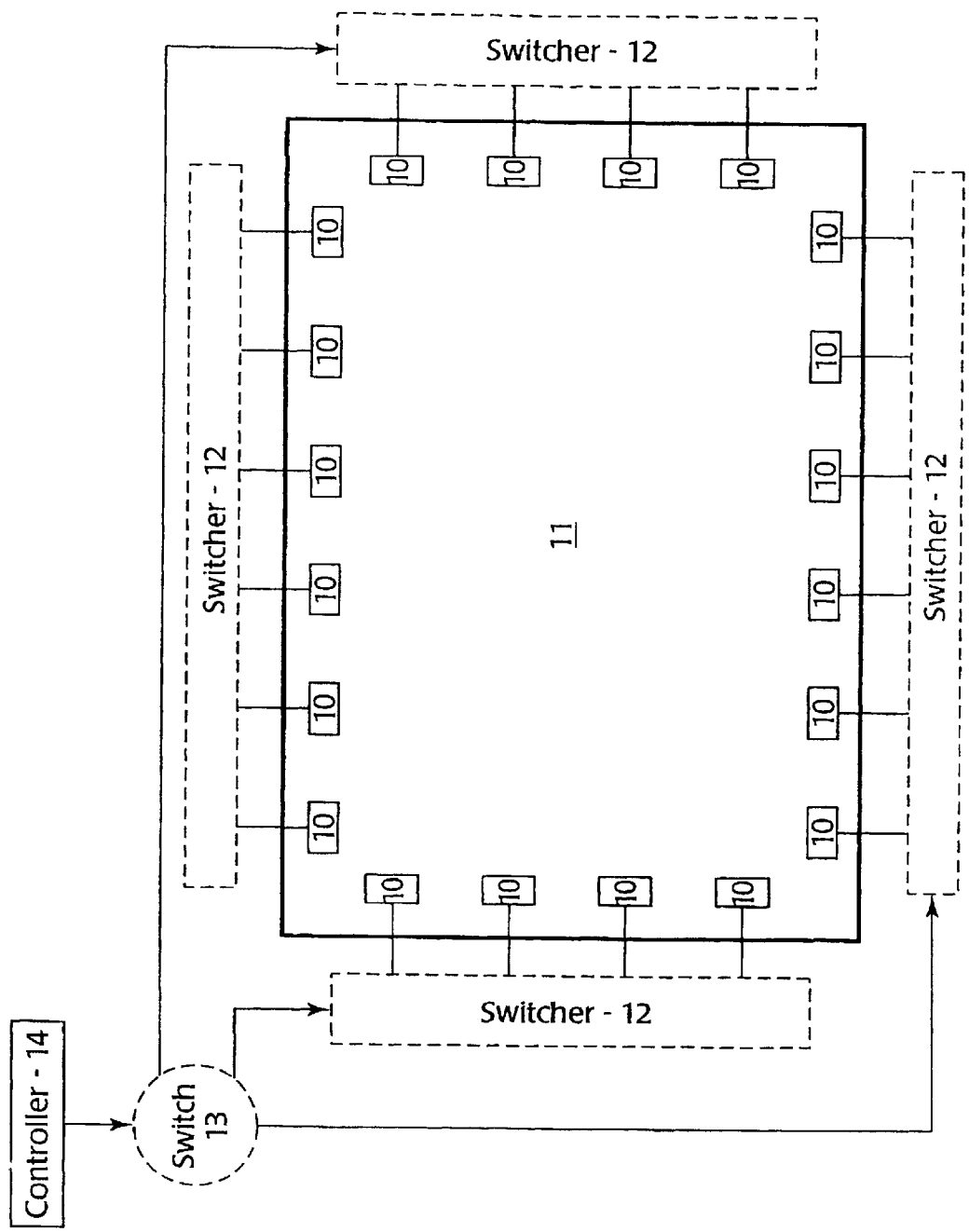
FIG. 3 of the prior art shows a multi-element system, employing a quasi bus bar method, wherein a reasonable linear gradient is produced by switching a voltage across one axis while holding the other off, switching sequentially between the selected electrodes.
Figure 4:
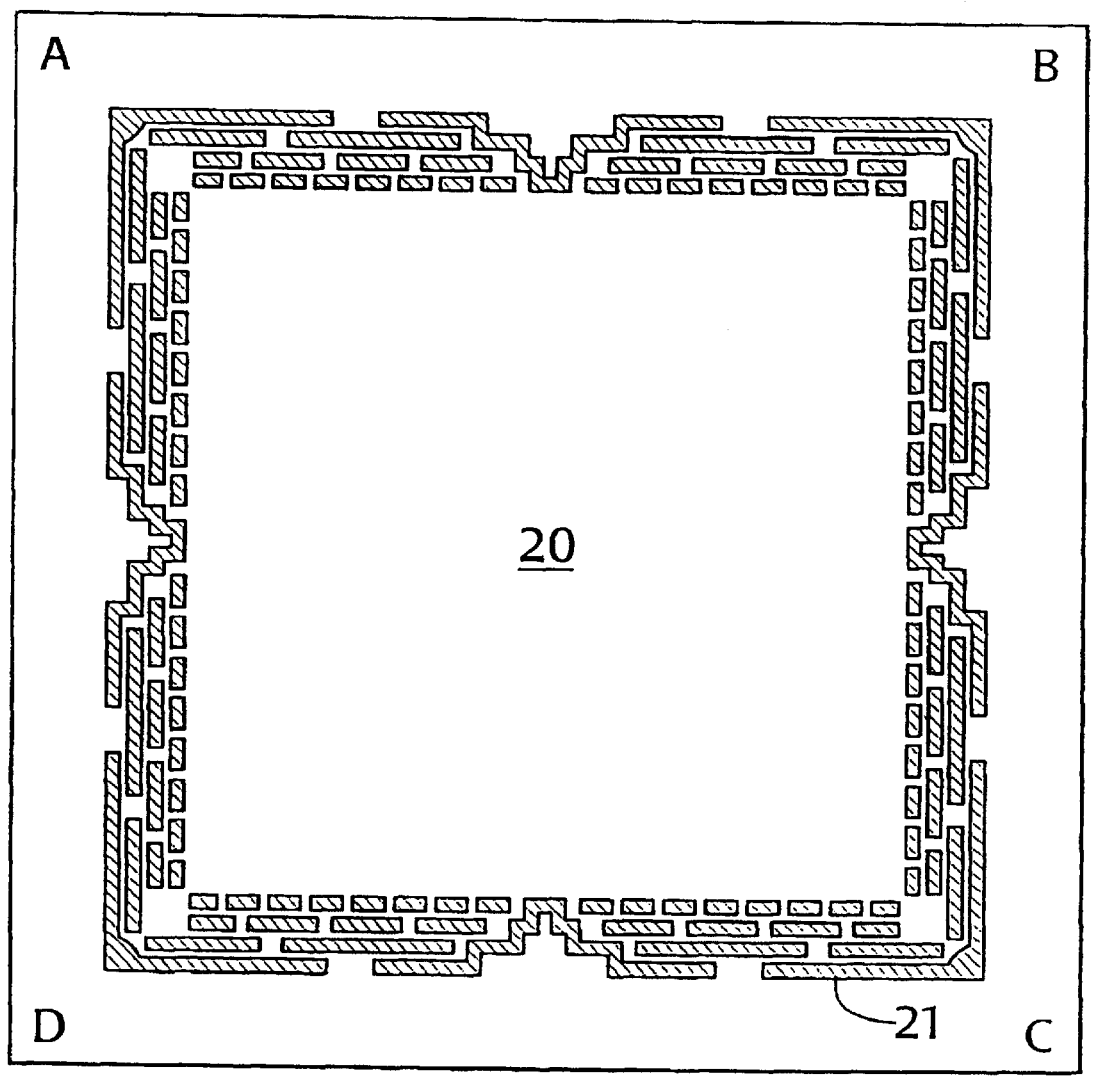
FIG. 4 of the prior art shows a resistive network, wherein the edges of the substrate have the same resistive characteristics as the center of the screen.

The detailed preferred embodiments of the invention will now be described with respect to the drawings. Like features of the drawings are indicated with the same reference numerals.

The system according to the present invention applies a mapping relation, e.g., an algorithm including a polynomial equation, which efficiently maps the input values from the detectors to a coordinate scheme, with the required degree of accuracy. In fact, it has been found by the present inventors that the number of polynomial coefficients required for a desired performance, e.g., 1% of full scale accuracy, is significantly less than the number of measured points required to derive these coefficients.

For typical ITO coated glass substrates used for resistive touch position detectors, this results in efficient polynomial coefficient storage. This system, in principal, has broad application where a mapping is desired between a plurality of detector outputs relating to a physical disturbance and a coordinate system position of the physical disturbance.

Where the sensor system includes a dedicated controller, the algorithmic mapping system controller is preferably implemented as a single chip microcontroller which also serves as the communication controller for the touchscreen device, outputting coordinates to the host computer system over, e.g., a serial communication port. In addition, it is preferred that the processing overhead for the mapping relation be small enough to allow use of simple, low cost, low power microcontrollers, such as the Intel 80C51 and various known derivatives, and application specific integrated circuits incorporating an 80C51 core device. Advantageously, the microcontroller includes an analog-to-digital converter (ADC) having at least 10 bits of resolution, although separate ADCs having 12–16 bits may also be used. The mapping data according to the present invention is stored in a memory, which is preferably physically associated with the touchscreen. For example, a serial-output electrically programmable read only memory (EEPROM) may be physically included in the housing or attached cable of the sensor, for storing the coefficients. Another example is an EEPROM included in, or associated with, a single chip microcontroller.

The mapping system according to the present invention may also be provided as a software driver system in a connected host processor. In this case, it is necessary to communicate to the host processor the algorithmic coefficients for mapping of the sensor panel. The host system may be, e.g., a computer system running Macintosh System 7, UNIX, or Windows.

The present system provides a plurality of detectors, and preferably at least three detectors, as inputs to the mapping equation. More preferably, four detectors are provided, each being located at a corner of a rectangular substrate.

As part of the production process of a sensor system, a measured data set is obtained for each touch screen to obtain a set of detector outputs at determined locations. Preferably, these points are in a grid, and more preferably in a predetermined array. However, so long as the physical positions of physical effect are accurately known, there is no requirement that the set of points be the same for each sensor system. A computer program then solves the above mentioned N simultaneous equations to find the polynomial coefficients of a mapping equation for that specific touch screen, then stores them into a non-volatile memory device which is preferably an integral part of the touch screen assembly. During use, when the touchscreen is connected to its computer (either a dedicated computer within a separate controller or the host computer associated with the touch system) the computer upon system initialization will read the non-volatile memory, retrieving the coefficients for that particular screen and storing them in its local memory, subsequently employing them to derive a touch location from measured current data. Each screen is thus individually characterized so that unit to unit variations are individually corrected. Ultimate accuracy is only dependent on the hardware and complexity of the chosen model. Therefore, the present invention allows a range of mapping complexity to be implemented.

EXAMPLE 1

Figure 9:
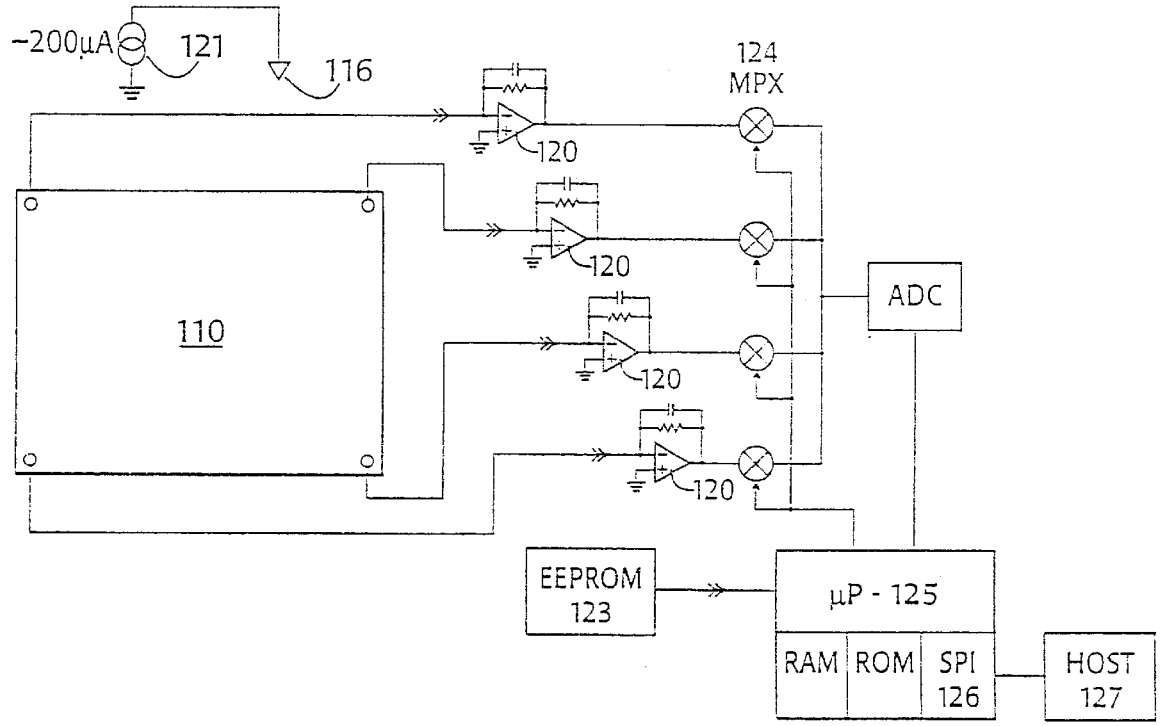
FIG. 9 is a block diagram of an alternate controller for a touchscreen as shown in FIG. 6.

As shown in FIG. 9, a sensor substrate 110 consisting of an indium-tin oxide (ITO) coating 111 with an average resistivity of 250 ohms/square on an approximately 10" by 12½" soda-lime glass substrate 112, having on each corner a 0.5" square coating of silver frit is provided. Manufacturing tolerance of the resistivity of the ITO coating is about ±10%, and thus there may be significant surface variations. Electrical connections in each corner of the substrate were approximately 0.25" square and located 0.25" from each edge. The touch probe 116 was connected to a −200 μA constant current source 121 with a small (about 0.032") ball tipped metal stylus, which was pressed directly against the ITO surface. For calibration of measurement positions, touch location was defined by a checking grid made from 0.062" ABS plastic having ninety nine, 0.062" holes drilled on 1" centers, 11 columns for X and 9 rows for Y.

Because the system incorporates a constant current driver, the resistivity of the coating is not a factor in the design of the sensor, thus enabling the most cost-effective coating to be selected.

The sensor device is interfaced with a circuit for measuring an electrical signal through each of the possible paths from the repositionable probe to the fixed electrodes. For example, a constant current is injected, i.e., sourced or sunk, through the repositionable probe, and the fixed electrodes are clamped at ground potential (or an arbitrary reference potential with respect to ground), with the respective currents measured. Alternatively, a current may be presented between the repositionable electrode and each fixed electrode, with the respective impedances measured.

The electrical connections were formed silver frit contact, although other suitable stable electrical contact systems may be employed. Each corner electrode is held at a virtual ground by an operational amplifier configured as a transconductance amplifier 120, such as an National Semiconductor LF347N, and the respective currents converted to voltage signals. The use of transconductance amplifiers allows high gain and low sense current operation, and avoids the distortions which are generally introduced by sense resistors, and high currents which may damage certain coatings, such as nickel-gold. Other types of current measurement techniques are known, and may be employed. The transconductance amplifiers employed in the present system are inverting, and therefore the repositionable electrode sinks current rather than sources it to provide a positive output from the amplifier.

Figure 10:
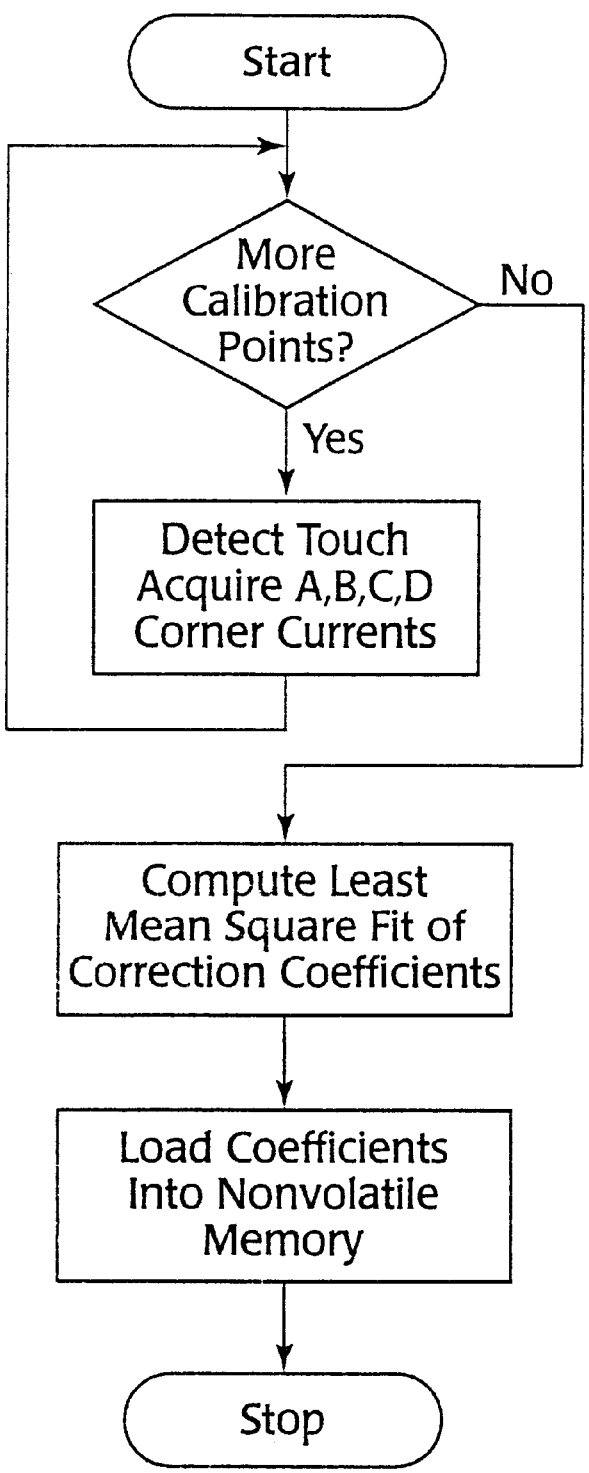
FIG. 10 is a flow diagram of a measurement procedure according to the present invention.

During the initial measurement procedure to determine the mapping relationship to be employed by the sensor system, i.e., to define the values of information to be stored in the memory associated with the sensor system, as shown in FIG. 10, the output of the analog-to-digital converter is ported by the microprocessor through the serial port on the board, without algorithmic processing. Thus, an external system obtained the detector output values, which were recorded in conjunction with actual measurement characterization conditions.

The initial measurement procedure proceeds as follows. A loop is executed to sequentially detect touch as various positions on the substrate 150, until all values are obtained 151. After the required data is obtained, the least mean square fit of mapping coefficients is obtained. These coefficients are then stored in memory 153.

According to the present invention, a plurality of measured points are analyzed for determination of the algorithmic mapping. Preferably, a number of measured points are obtained, e.g., ninety-nine points in a nine by eleven rectangular array, spaced one inch between centers on the sensor substrate surface, or for a quadrant-based system, 30 points per quadrant. More generally, the number of measured points is selected to be sufficient, on a population basis, to provide a suitable accuracy of the touchscreen. The change in standard deviation value, which is a statistical measure used to verify the goodness of fit, per additional point, thus tends to diminish to within a desired range when sufficient data is obtained.

These signals were input to a microcomputer system having a 12-bit analog-to-digital converter (ADC) with four inputs. The ADC is preceded by a multiplexer, which sequentially reads the voltage output of each corner electrode transconductance amplifier through a multiplexer 124, which is then passed to the processor 125. When the four corner current values were determined, the processor computed the corrected position employing predetermined coefficients stored in an electrically programmable read only memory (EPROM), which is a nonvolatile memory. In another embodiment, the nonvolatile memory 123 is associated with the sensor and provides data through a serial link to the processor. The position data may then be passed through a serial link 126 to a host processor 128.

The mapping coefficients were computed using MathCad software from measurements obtained using the above method. This method is outlined below and in more detail in Appendix A. It is noted that C programming language code executes more efficiently, and may be advantageously be employed.

The current flowing into the substrate from the relocatable injection electrode is collected as the sum of the currents at each of the four sensing electrodes. Then, with the sum of the four currents being equal to a constant, i.e. A+B+C+D= constant, there exists a unique set of individual corner currents for each location on the touchscreen surface where the current is injected, which set includes any manufacturing variances for that specific touchscreen assembly.

A general mapping polynomial expression is employed that directly transforms these four corner currents into physical X and Y coordinates for that specific sensor, in the general form of:

$$y=(a0+a1A+a2B+a3C+a4D+a5A^2+a6AB+a7AC+a8AD++a9B^2+a10BC+a11BD+a12C^2+a13CD+a14D^2)$$

$$x=(b0+b1A+b2B+b3C+b4D+b5A^2+b6AB+b7AC+b8AD++b9B^2+b10BC+b11BD+b12C^2+b13CD+b14D^2)$$

wherein A, B, C and D are the respective corner currents, a1 ... a14 and b1 ... b14 are the derived coefficients, and x and y are the coordinate positions.

One system according to the present invention applies a mapping algorithm having individualized mathematical coefficients, suitable for defining a mapping relation of all or a portion of the sensor system. The algorithm may include terms having differing magnitudes, and in fact, terms which are expected to have low absolute values over the entire range of inputs may be eliminated from consideration, thus simplifying evaluation of the mapping algorithm. The sensor active area, i.e., the touch position sensitive portion, may be subdivided into regions, each associated with a different set of algorithmic mapping coefficients. For example, the sensor may be subdivided into quadrants, and the presence of the repositionable electrode within any given quadrant determined based on a simple pre-analysis of the corner electrode data to find the largest value. This regional localization allows application of a mapping relation including a set of coefficients optimized for that region.

Thus, the corner current-squared terms, $a5A^2$, $a9B^2$, $a12C^2$ and $a14D^2$ may be omitted (a5, b5, a9, b9, a12, b12, a14, and b14 each equal 0) for some screen designs, because these terms are expected to have low significance in the mapping algorithm, and evaluation thereof is not usually required to achieve a particular desired performance. This equation thus includes the zero order, first order and cross product terms, but not higher order terms.

The characterization process for each sensor system involves recording the value of the electrical signals at each of the sensing electrodes, relative to a grid of physical positions on the substrate, each position on the grid being activated by a repositionable electrode, this electrode being the cover sheet activated by a stylus positioned by a highly accurate positioning device. The recorded values, which are temporarily held in the test computer, are then used in a least squares curve fitting program in the test computer, selecting coefficients for a fit equation which seeks to minimize the sum of the squared error between the coordinate produced by the equation and the actual physical coordinate.

A set of coordinate values for X and Y are given as the desired output from the model polynomial. The difference between the value of each actual point and the value given by the polynomial is squared. To illustrate, the simplified equation for the squared error in Y is in the form:

$$\text{Error} = \sum_{i=1}^{N} (Y_i - Ycalc_i)^2$$

where $Ycalc_i = a0 + a1 \cdot A_i + a2 \cdot B_i + a3 \cdot C_i +$ $a4 \cdot D_i + a5 \cdot (A_i)^2 a6 \cdot A_i \cdot B_i + a7 \cdot A_i C_i \cdots$ $+ a8 \cdot A_i \cdot D_i + a9 \cdot (B_i)^2 + a10 \cdot B_i \cdot C_i + a11 \cdot B_i \cdot D_i + a12 \cdot (C_i)^2 \cdots$ $+ a13 \cdot C_i \cdot D_i + a14 \cdot (D_i)^2$ This results in the form of an N dimensional bowl-shaped 'surface which has a minimum value at some point in N space (the dimension depends on the number of coefficients). The object is to solve for the coefficients of the polynomial that produce the minimum error for a given data set (an array of current values from the sensing electrodes based on a grid of specific points on the touch screen). Solving for the coefficients involves partial differentiation of the squared error term with respect to each coefficient, setting each equation to zero to find the minimum error for that coefficient, then solving the resulting N simultaneous equations.

Differentiating with respect to, and solving for each coefficient in turn leads to a set of 15 equations for each coefficient respectively of each axis. An example of the above mentioned partial differentiation of the error term with respect to coefficient a5 is:

$$\frac{d}{da5}\text{Error} = \left[\sum_{i=1}^{N} A_i \cdot \begin{bmatrix} B_i \cdot Y_i - A_i \cdot B_i \cdot a0 - (A_i)^2 \cdot B_i \cdot a1 - A_i \cdot (B_i)^2 \cdot a2 \ldots \\ + \begin{bmatrix} A_i \cdot B_i \cdot a3 \cdot C_i - A_i \cdot B_i \cdot a4 \cdot D_i - (A_i)^3 \cdot B_i \cdot a5 - (A_i)^2 \cdot (B_i)^2 \cdot a6 \ldots \\ + \begin{bmatrix} (A_i)^2 \cdot B_i \cdot a7 \cdot C_i - (A_i)^2 \cdot B_i \cdot a8 \cdot D_i - A_i \cdot (B_i)^3 \cdot a9 \ldots \\ + \begin{bmatrix} A_i \cdot (B_i)^2 \cdot a10 \cdot C_i - A_i \cdot (B_i)^2 \cdot a11 \cdot D_i - A_i \cdot B_i \cdot a12 \cdot (C_i)^2 \ldots \\ + A_i \cdot B_i \cdot a13 \cdot C_i \cdot D_i - A_i \cdot B_i \cdot a14 \cdot (D_i)^2 \end{bmatrix} \end{bmatrix} \end{bmatrix} \end{bmatrix} \right]$$

The error is then set to zero to find the minimum for each coefficient as follows:

$$0 = \left[ \sum_{i=1}^{N} A_i \cdot \begin{array}{l} B_i \cdot Y_i - A_i \cdot B_i \cdot a0 - (A_i)^2 \cdot B_i \cdot a1 - A_i \cdot (B_i)^2 \cdot a2 \ldots \\ + \left[ \begin{array}{l} A_i \cdot B_i \cdot a3 \cdot C_i - A_i \cdot B_i \cdot a4 \cdot D_i - (A_i)^3 \cdot B_i \cdot a5 - (A_i)^2 \cdot (B_i)^2 \cdot a6 \ldots \\ + \left[ \begin{array}{l} (A_i)^2 \cdot B_i \cdot a7 \cdot C_i - (A_i)^2 \cdot B_i \cdot a8 \cdot D_i - A_i \cdot (B_i)^3 \cdot a9 \ldots \\ + \left[ \begin{array}{l} A_i \cdot (B_i)^2 \cdot a10 \cdot C_i - A_i \cdot (B_i)^2 \cdot a11 \cdot D_i - A_i \cdot B_i \cdot a12 \cdot (C_i)^2 \ldots \\ + A_i \cdot B_i \cdot a13 \cdot C_i \cdot D_i - A_i \cdot B_i \cdot a14 \cdot (D_i)^2 \end{array} \right] \end{array} \right] \end{array} \right] \end{array} \right]$$

Thus allowing solution of 15 equations for 15 unknown coefficients for each axis. Similarly, the least mean square fit coefficients for other equations may be determined and applied to produce the sensor system output.

Although the previous discussion is the standard explanation of least squares, the described technique does not lend itself to varying the mapping equation easily during the design phase of a particular screen design. The partial differential equations are tedious to perform and the subsequent arrangement of the equations for solution by computer is time consuming. A better technique solves the least squares curve fit by matrix techniques, using the fact that the residual error vectors are orthogonal to each vector of detector values. Using this method, the N partial derivatives, which are tedious to develop, are no longer necessary.

A brief development in general matrix notation follows. Let $Ycalc_i = a0 + a1 \cdot A_i + a2 \cdot B_i + a3 \cdot C_i +$ $a4 \cdot D_i + a5 \cdot (A_i)^2 + a6 \cdot A_i \cdot B_i + a7 \cdot A_i \cdot C_i \ldots$ $+ a8 \cdot A_i \cdot D_i + a9 \cdot (B_i)^2 +$ $a10 \cdot B_i \cdot C_i + a11 \cdot B_i \cdot D_i + a12 \cdot (C_i)^2 \ldots$ $+ a13 \cdot C_i \cdot D_i + a14 \cdot (D_i)^2$ where Ycalc is the calculated value of the coordinate in Y. Now let A represent the vector formed by the coefficients (a0, a1, a2 . . . , a14). Also, let the letter G represent the vector formed by the detector measurements and the combinations of the detector measurements:

$G = (1A\ B\ C\ D\ A^2\ A \cdot B\ A \cdot C\ A \cdot D\ B^2\ B \cdot C\ B \cdot D\ C^2\ C \cdot D\ D^2)$ Now $G^T \cdot (Y - Ycalc) = 0$ because the vector of residuals, the differences between actual and calculated coordinates, is orthogonal to the vectors of measured values.
And since $Ycalc = G \cdot A$ Then $G^T \cdot (Y - G \cdot A) = 0$ and $G^T \cdot G \cdot A = G^T \cdot Y$ Solving for A gives $A = (G^T \cdot G)^{-1} \cdot G^T \cdot Y$ The vector of coefficients, A, are the same as those arrived at through the partial differentiation approach described previously.

Extra parameters can be easily added to the G matrix (e.g. selected terms of the four corner current values) for evaluation of their effect on residual error. The coefficients contained in vector A above can be solved through standard linear algebra techniques such as LU decomposition or QR decomposition (Gram-Schmidt orthogonalization). The preferred method utilizes the QR decomposition technique which is less susceptible to poorly conditioned matrices. A side benefit of the QR decomposition is that it provides a verification that the measured values are linearly independent and thus unique for each touch location.

The resulting coefficients are stored in a non-volatile memory which is part of the touchscreen assembly (alternatively they may be stored on a computer floppy disk to be loaded into the host computer of which the touchscreen ultimately becomes a part). During use, the touch system will employ these coefficients to calculate a touch location directly from measured detector values. These detector values are used as variables A, B, C, and D in one equation each for X and for Y, similar to that shown above for Y, the coordinate output being accurate to within a desired limit without further corrections. The only values used to describe touchscreen characteristics are the derived coefficients. Original values from the test grid of physical locations are not employed following the curve fit process. Thus, in contrast to table-look-up correction schema, they are not a requirement. What is stored are coefficients of a mathematical function that directly maps the sensing electrode values into X and Y.

In a further embodiment, the quadrant of a touch position is estimated based on the raw data input, and the appropriate algorithm applied. Accordingly, 11 equations are solved for 11 unknown coefficients for each axis, in each quadrant. In this case, one coefficient may be normalized, so that only 10 coefficients need be stored for each polynomial. The coefficients are then programmed into non-volatile memory associated with the digital signal processor.

Figure 5:
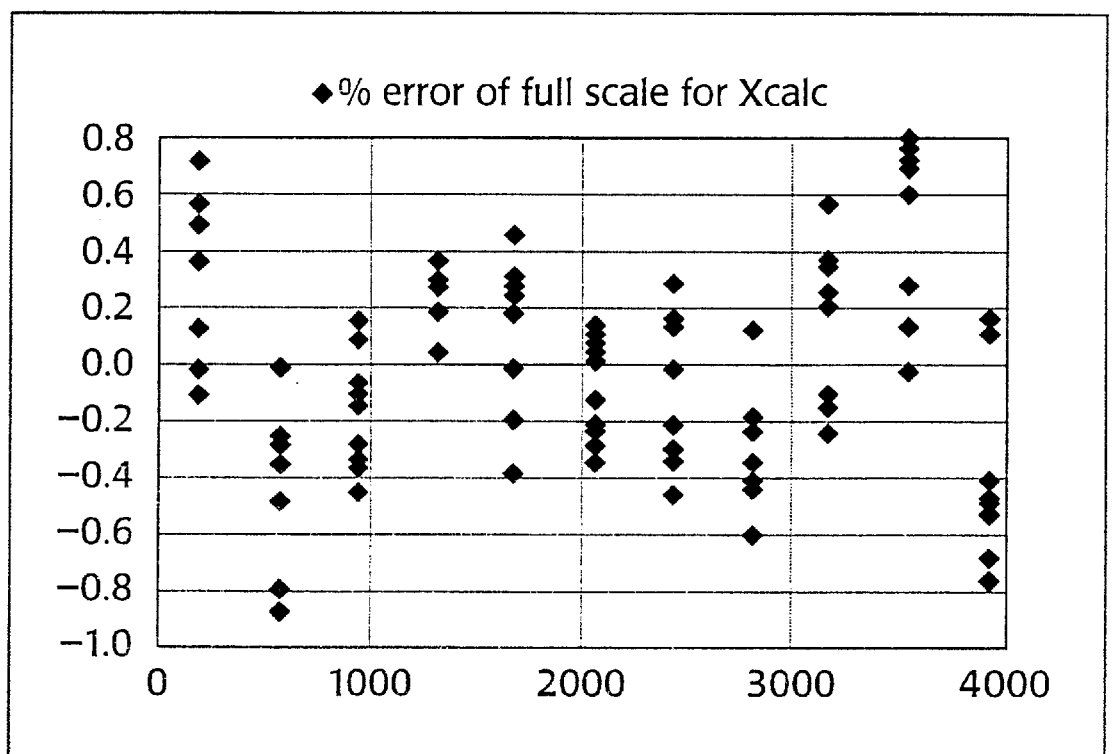
FIG. 5 of the present invention is a graphical representation of accuracy with the substrate divided into quadrants.

Using this quadrant approach, accuracies on the order of one percent of full scale were readily achieved. FIG. 5 shows typical accuracies for X reported versus X actual for an example touchscreen according to the present invention. It is noted that the product terms of corner currents need be calculated only once for corresponding terms of the mapping algorithm for each respective axis, thereby simplifying calculation execution.

Appendix B shows, in more detail, the derivation and calculation of the X and Y direction curve fits in the first quadrant. Appendix C shows a curve fit for the first quadrant, using the above described technique with the addition of a third order term, BCD, which improves the curve fit.

Using the present system, 10 coefficients are required for each of X and Y in each of the four quadrants, therefore requiring storage for 80 coefficients. These coefficients are calculated and applied with 16 bit precision, and will fit in a 2 Kbit memory device, e.g., a 93C56A EEPROM, to achieve about 2% full scale accuracy.

According to a preferred embodiment, the system according to the present invention applies a predetermined form of algorithm, with a set of coefficients which vary between examples of the sensor system based on an individual measurement step. Therefore, in such a system, each unit is assembled, and a predetermined initial measurement procedure performed to determine the values of information corresponding to the mapping relationship to be stored, including the application of a repositionable electrode or fixture to a plurality of positions while injecting a current signal, with the resulting electrical signal from the plurality of electrodes on the conductive surface measured. After the measurements are obtained, the measurement data is processed to produce a set of coefficients, which are stored in a memory in conjunction with the sensor system. For example, a coupled memory device as disclosed in U.S. Pat. No. 5,101,081, incorporated herein by reference, may be employed. Of course, other arrangements may be used. The mapping coefficients may also be provided separately from the sensor system, e.g., on a magnetic disk (floppy disk) or in a module. Therefore, the algorithmic processor for mapping the sensor system output need not be integral with the sensor system, and advantageously, the processor is a host executing both a mapping algorithm and application software.

Figure 7:
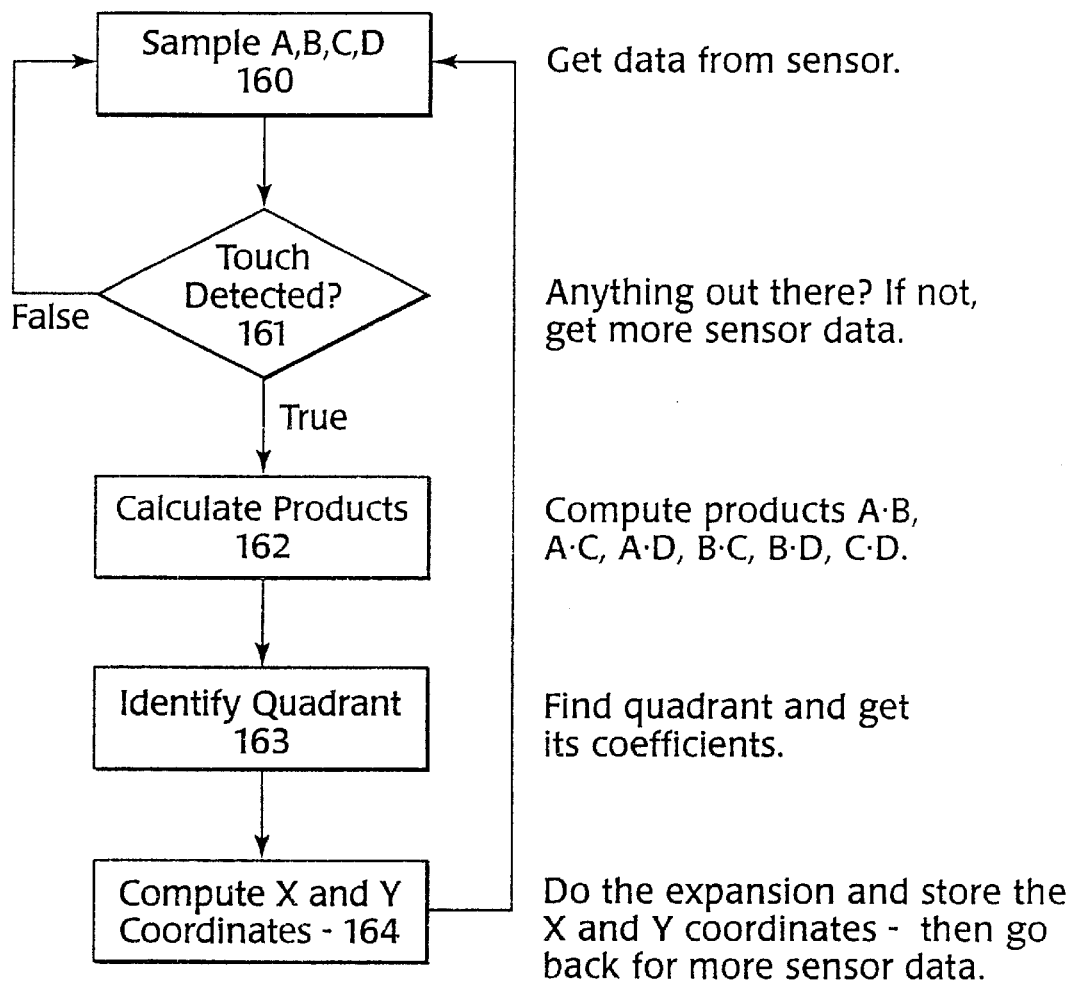
FIG. 7 of the present invention is a flow chart of a method of mapping the sensor according to FIG. 6.

During operation, as shown in FIG. 7, the processor controls the multiplexer to sequentially sample the values derived from the current passing through each corner electrode 160, digitize the voltage, and store these values in random access memory in the processor. The values are then pre-analyzed for detection of a touch 161, and if detected, processing continues to determine the position of the touch. The various products are calculated 162, and the quadrant in which the touch occurs identified 163. The processor then evaluates the mapping equation for both the X and Y axis 164, and outputs the X and Y coordinates in bit-serial manner through the serial data interface, generally complying with the RS-232 format at approximately 9600 baud.

In processing the signals from the electrodes, optionally further processing may be conducted to reduce noise and possibly introduce a small zone of hysteresis. Further standard input processing techniques, such as input debouncing, may also be implemented in conjunction with the present invention.

The processor may optionally determine the impedance of the contact by determining the voltage imposed by the current source on the repositionable electrode, to determine whether the force or touch on the cover sheet is sufficient to allow the nominal current to pass, i.e., whether the current source is operating at a "rail" of the power supply. Thus, a threshold touch may be defined to avoid false touch indications.

A type of self calibration may be employed, based on the baseline readings from the sensor system. Thus, the detector outputs during a "no touch" baseline period may be employed to extract out any baseline drift or interference. In general, this compensation requires a system in which signals are superposed additively, or where the superposition effects are otherwise known.

EXAMPLE 2

Figure 6:
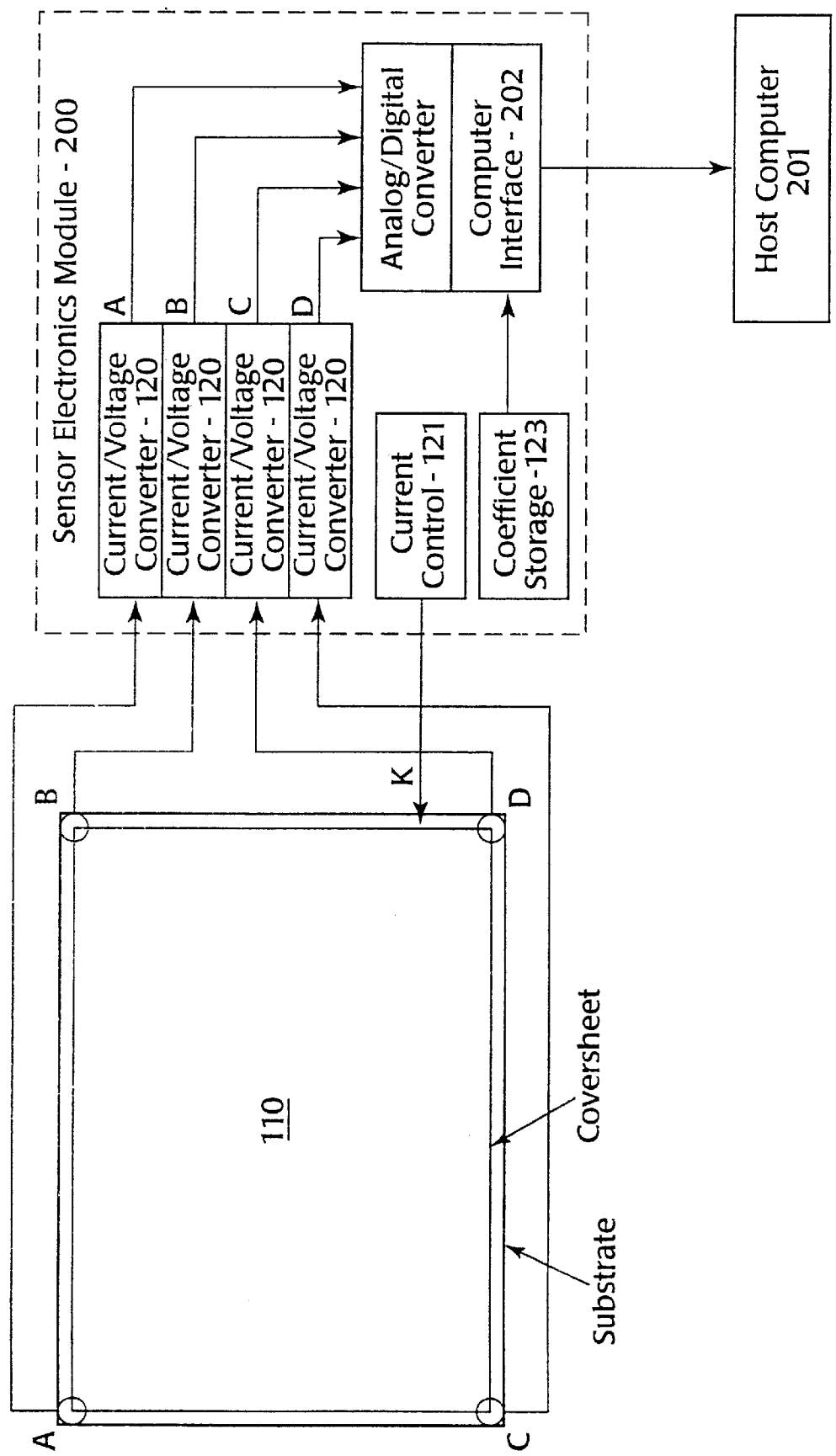
FIG. 6 of the present invention is a simplified block diagram of a touch screen sensor employing a host computer to compensate the output.

A conductive surface substrate 110 is provided essentially as in Example 1. However, as shown in FIG. 6, no microcontroller is provided in conjunction with the sensor system. Instead, an analog data acquisition system 200 with an input multiplexer and serial interface is provided which sequentially polls the inputs and transmits the data in serial format through a serial interface driver 202 to a host processor 201, which evaluates the mapping algorithm from the raw data. Upon startup, the host processor 201 reads the contents of a coefficient storage nonvolatile memory 123, through the serial interface driver. After the stored data is transferred, the system then transmits the digitized data from the analog data acquisition system 200.

EXAMPLE 3

The system according to the present invention is also applicable to capacitive touch position sensors. In this case, a constant current RMS AC signal is selectively injected through one of the fixed electrodes on the conductive surface, e.g., 200 $\mu$A sinusoidal RMS. The repositionable electrode includes a dielectric barrier material with an impedance to a reference, so that proximity to the conductive barrier contact attenuates the signal at that point, resulting in a variable current loss. The current at each of the other fixed electrodes is measured. The input current is therefore equal to the currents measured at the other corners plus the parasitic losses of the system. When a dielectric touches the surface, a further loss occurs, the position of which may be measured as a function of the three sensed corners.

In another capacitive touch system, a constant current RMS AC signal is selectively transmitted from a touch position to a conductive surface. AC currents at the plurality of electrodes are measured using known techniques. A known capacitive sensor system includes an overlay sheet, having an insulating separator from a conductive substrate, disclosed in U.S. Pat. No. 4,623,757, incorporated herein by reference. This type of touch position sensors may also be generally compensated according to the present invention.

Figure 8:
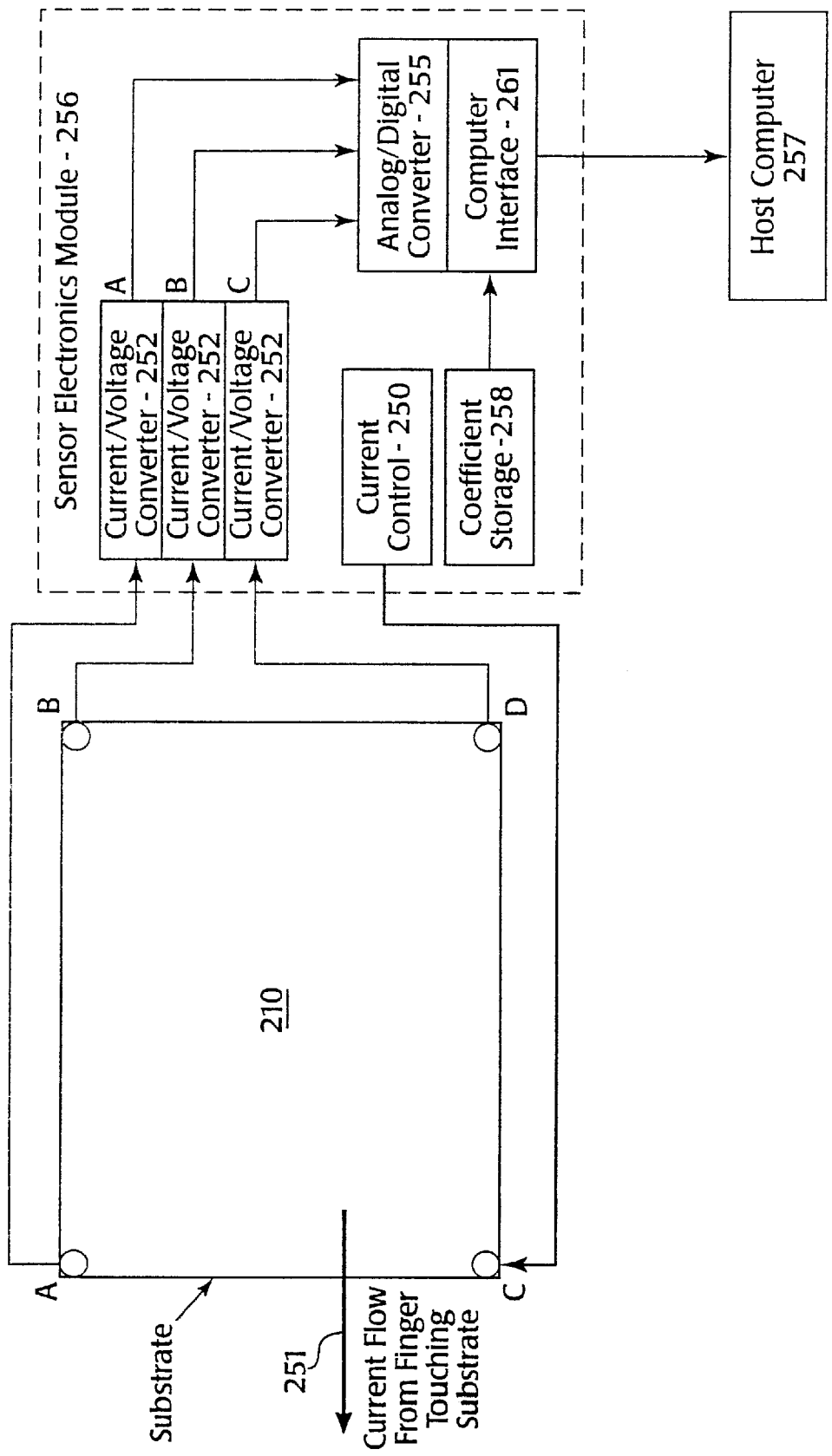
FIG. 8 of the present invention is a capacitive embodiment, in which source excitation is provided as AC current fed to one corner, with a current flow at the remaining 3 current detectors monitored for the effects of a dielectric.

A capacitive embodiment of the invention is accomplished by providing a source of alternating current to one corner of a resistively-coated substrate, and sensing the current flow at the remaining three corners, as shown in FIG. 8. A touch at any location on the surface of the substrate will result in a current being drawn from that location and because of the current flow relationships discussed in the resistive embodiment, there will be a set of currents at the three sensed corners that is unique to that touched location. In a similar manner to that described for the resistive embodiment, a set of coefficients may be derived to allow mapping of the three sensing electrode transform these unique sets into a two-dimensional coordinate system.

A substrate is provided generally as in Example 1. As shown in FIG. 8, one corner of the substrate 210 is connected to an alternating current constant current source 250, having an output of 200 $\mu$A RMS. If DC coupled to the amplifiers, the input signal preferably has a negative voltage bias. The probe 251 is any dielectric with a ground path, e.g., a human finger. The three remaining corners of the substrate are connected to transconductance amplifiers 253. The output of the transconductance amplifiers 253 are then multiplexed and sequentially read by an analog to digital converter 255. The sensor system 256 is interfaced serially through a serial port interface 261 with the host 257. A nonvolatile memory 258 is associated with the sensor system, which includes stored mapping coefficients. Upon initialization, the host system 256 reads the stored mapping coefficients from the nonvolatile memory 258 through the serial port interface 261 and stores then in random access memory associated with the host computer 257. Thus, no microprocessor need be provided with the sensor system 256.

EXAMPLE 4

Figure 11:
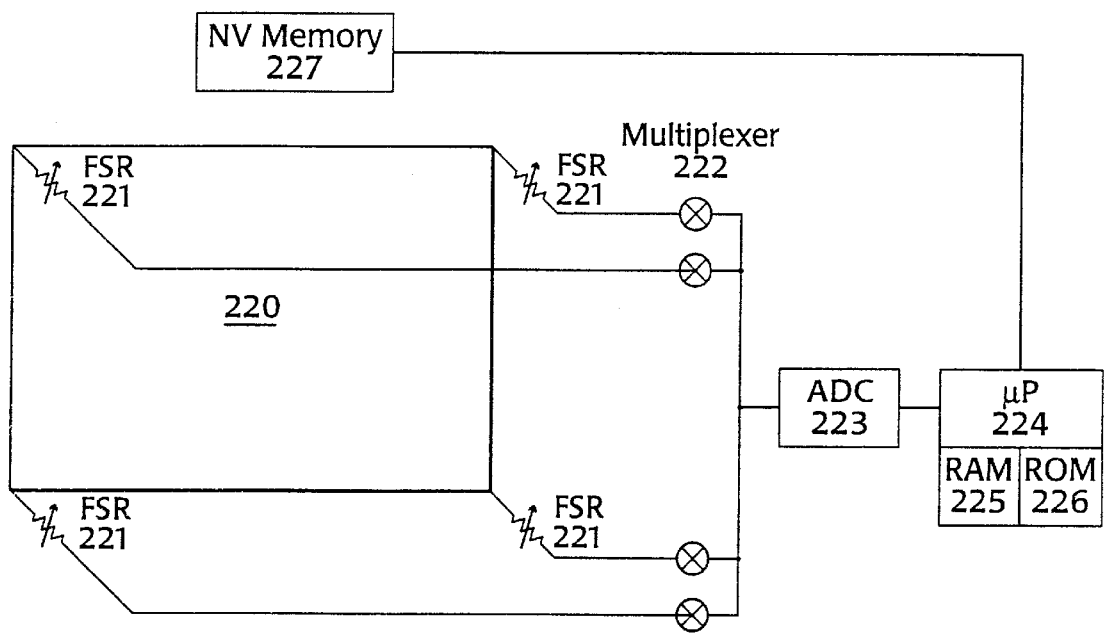
FIG. 11 is a semischematic view of an algorithmically compensated pressure and position sensor.

As shown in FIG. 11, a substrate 220 is provided having a plurality of force detectors 221. The outputs of the detectors 221 are multiplexed through multiplexer 222 and digitized by analog to digital converter 223. A microcontroller 224 receives the output of the analog to digital converter 223, and determines a position of touch based on a mapping algorithm stored in ROM 226, based on a series of coefficients stored in nonvolatile memory 227 which are derived from an initial measurement procedure and least mean square fitting. The force against the substrate is divided between the detectors 221, with a nonlinear relationship between the touch position and the response of any detector 221. The output response of each detector 221 may also be nonlinear. Further, compliance of the substrate 220 may also produce nonlinearities. The algorithm corrects for the relationship of force location and detector 221 output to produce a corrected results.

There has thus been shown and described novel receptacles and novel aspects of contact state determining systems, which fulfill all the objects and advantages sought therefor. Many changes, modifications, variations, combinations, subcombinations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A system for relating a plurality of input values, each being responsive to and varying smoothly over a range of positions of a condition, with coordinate positions of the condition over a surface of a medium, comprising:
   (a) a plurality of inputs receiving a set of input values produced in response to a condition at a coordinate position on the surface of the medium; and
   (b) a memory for storing information relating to a mapping relationship of the plurality of input values to a coordinate position of the condition, said stored information including information derived for said medium and set of inputs from empirical observation, to account for an actual configuration of said medium and set of inputs.

2. The system according to claim 1, wherein the mapping relationship comprises a plurality of terms, each term being a coefficient or a mathematical function of at least one coefficient and a value associated with at least one detector output, the mapping equation relating the detector outputs with a position of the applied physical effect.

3. The system according to claim 1, wherein the mapping relationship comprises a mapping function operating to directly map the detector outputs to corrected coordinate positions of physical effects substantially without an intermediate representation of an uncorrected coordinate position.

4. The system according to claim 1, wherein the mapping relationship operates to map a localized physical effect detected by at least three detectors to a coordinate position of said location of the physical effect, said stored information including information derived for said medium and detectors from empirical observation, to account for an actual configuration of said medium and detectors.

5. The system according to claim 1, further comprising a processor for processing the input values at a plurality of distinct coordinate positions to derive the mapping relationship.

6. The system according to claim 1, further comprising a processor for processing the set of input values to determine a coordinate position of a condition, based on the stored information relating to the mapping relationship.

7. The system according to claim 1, wherein said position is a Cartesian coordinate position, said memory storing coefficients of a pair of mapping equations corresponding to said pair of Cartesian coordinates.

8. The system according to claim 1, wherein the mapping relationship consists of a polynomial equation, comprising a sum of a plurality of selected product terms of coefficients and one or more detector outputs.

9. The system according to claim 1, wherein the mapping relationship comprises a polynomial equation, the polynomial equation comprising a sum of a plurality of selected product terms of coefficients and one or more detector outputs, the plurality of terms being selected such that a predetermined minimum accuracy is achieved with minimum computational complexity.

10. The system according to claim 1, wherein the mapping relationship comprises a polynomial equation, the polynomial equation comprising a sum of a plurality of selected product terms of coefficients and one or more detector outputs, the plurality of terms being selected such that a predetermined minimum accuracy is achieved with a minimum number of coefficients.

11. The system according to claim 1, wherein the mapping relationship consists essentially of a polynomial equation, comprising a sum of a plurality of product terms of coefficients and input values, each term being between order zero and order four in the input value space.

12. The system according to claim 1, further comprising the step of providing four detectors for receiving the set of input values, the mapping relationship being equations of the form:

$$y=(a0+a1A+a2B+a3C+a4D+a6AB+a7AC+a8AD+a10BC+a11BD+a13CD)$$

$$x=(b0+b1A+b2B+b3C+b4D+b6AB+b7AC+b8AD+b10BC+b11BD+b13CD)$$

wherein A, B, C, and D are input values corresponding to the four detectors, a0 . . . a13 and b0 . . . b13 being coefficients selected to optimize an error of the determined positions, and x, y is the coordinate position.

13. The system according to claim 1, wherein the surface is provided on a medium having a characteristic plane, divided into quadrants, further comprising the steps of producing a set of quadrant mapping relationships for each quadrant, the quadrant mapping relationships being equations having sets of coefficients, further comprising the steps of estimating a quadrant of the condition-effecting element and then applying a mapping relationship based on the estimated quadrant, employing the corresponding set of mapping relationship coefficients.

14. The system according to claim 1, wherein said mapping relationship is a mapping equation having coefficients, said coefficients being determined based on a predetermined set of mapping equation terms, using a least mean square error fitting of said detector outputs to said determined positions of said physical effect applied to said medium.

15. The system according to claim 1, wherein the mapping relationship comprises an mapping equation having a set of coefficients, further comprising the steps of:
   providing a memory for storing the coefficients, and a host processor for evaluating the mapping equation and executing application software, the processor comprising local storage;
   transferring the coefficients stored in the memory to the local storage; and evaluating the mapping equation with the processor.

16. The system according to claim 15, wherein each of said coefficients is derived based on contributions from a plurality of detector outputs at a plurality of determined positions.

17. The system according to claim 16, wherein the determined positions are of sufficient number and of such arrangement to measure a configuration and a manufacturing variation of the system, the mapping equation being of sufficient complexity to compensate for the measured configuration and manufacturing variation.

18. The system according to claim 1, wherein the mapping relationship is derived based on sets of inputs at a plurality of coordinate are provided in a regular spaced arrangement.

19. The system according to claim 1, wherein said memory comprises a rotating magnetic storage disk.

20. The system according to claim 1, further comprising a host processor for evaluating said mapping relationship and executing application software, said host processor comprising local storage, and means for transferring the information stored in said memory to said local storage.

21. The system according to claim 1, further comprising an integrated structure for said medium and said inputs; a processor outside of said integrated structure for evaluating said relation; and an output transmitting information representative of said detector outputs from said integrated structure to said processor.

22. The system according to claim 1, wherein said substrate has a curved non-planar surface.

23. The system according to claim 1, wherein the condition is represented nonlinearly in said set of input values with respect to a coordinate position thereof.

24. The system according to claim 1, wherein each input signal is measured at a detector, said input values being nonlinearly related to a distance from a coordinate position to a respective detector.

25. The system according to claim 1, wherein said medium comprises an electrically conductive medium, and condition comprises a perturbation of an electrical field in said medium.

26. The system according to claim 25, wherein said inputs comprise electrodes in electrical communication with said conductive medium.

27. The system according to claim 25, wherein each of the electrodes has an electrical path, each input value being a current passing through one of the electrical paths of the associated electrode to interface electronics, said detectors, medium, and interface electronics being contained in an integrated structure, further comprising the an output from said interface electronics, said output of said interface electronics being transmitted out of said integrated structure.

28. The system according to claim 25, further comprising an electrode having a repositionable point of contact with the electrically conductive medium, the set of input values varying based on a position of the point of contact.

29. The system according to claim 25, further comprising interface electronics for generating detector output values based on said set of input values.

30. The system according to claim 25, further comprising a current source for injecting an electrical current having a time-varying waveform with respect to an electrical reference into said medium to produce said electrical field; and a conductive pathway to said electrical reference, having a dielectric barrier, said pathway and barrier being for effecting said electrical field at said coordinate position on said medium.

31. The system according to claim 25, wherein said conductive medium is formed by a method comprising depositing a conductive layer on a substrate, the deposited conductive layer being subject to manufacturing variations as localized differences in impedance.

32. The system according to claim 31, wherein said conductive medium comprises a glass sheet with a coating selected from the group consisting of indium-tin-oxide and antimony-tin-oxide.

33. The system according to claim 25, further comprising a conductive repositionable contact electrode; and a current source for inducing an electrical current to flow in said inputs and said repositionable contact electrode.

34. The system according to claim 33, wherein said current flows through said contact electrode and said conductive medium in series and said inputs in parallel.

35. The system according to claim 25, said medium comprising an electrically conductive medium having a rectangular surface, said inputs comprising four electrodes in electrical communication with corners of said rectangular surface, said detectors comprising electrodes in electrical communication with said conductive medium, said memory storing coefficients of a mapping relationship algorithm comprising a multiple variable least mean square fit of data relating to said detector outputs to said determined positions, said plurality of positions being of sufficient number and of such arrangement to measure a configuration and a manufacturing variation of said system, said mapping equation being of sufficient complexity to compensate for said measured configuration and manufacturing variation within a predetermined minimum accuracy.

36. The system according to claim 25, wherein said repositionable electrode comprises a conductive sheet spaced from said surface, and being locally deformable to alter a local spacing from said surface.

37. The system according to claim 25, wherein said inputs comprise spaced electrodes, one of said plurality of spaced electrodes and said repositionable electrode injecting an electrical current into said medium, and a remainder of said spaced electrodes each sense a resulting electrical signal in said medium to produce said set of input values.

38. The system according to claim 25, wherein said medium further comprises an electromechanical system for compensating said detector output.

39. The system according to claim 38, wherein said electromechanical system comprises a conductive pattern on said surface.

40. The system according to claim 39, wherein said conductive pattern is formed on a periphery of said surface.

41. The system according to claim 1, wherein said physical effect is a force, said detectors comprising force detectors, and said medium being a force-transmissive medium.

42. The system according to claim 1, further comprising an integrated structure including said medium and inputs, and a digital communications channel for transmitting the set of input values from the integrated structure.

43. The system according to claim 1, wherein said memory comprises a semiconductor memory physically associated with said medium and detectors.

44. The system according to claim 1, wherein the coordinate position comprises a pair of coordinates corresponding to an absolute position of the medium.

45. A method for relating a set including a plurality of input values, each being responsive to and varying smoothly over a range of positions of a condition, with coordinate positions of the condition over a surface, comprising the steps of:

(a) providing sets of measured input values produced at a plurality of distinct determined coordinate positions; and (b) processing the sets of measured input values in conjunction with the respective distinct coordinate positions thereof to derive a multidimensional mapping relation, the mapping relation relating a set of input values with an associated coordinate position.

46. The method according to claim 45, further comprising the steps of providing a set of input values relating to a condition at an unknown coordinate position, and processing the set of input values from an unknown coordinate position, based on the multidimensional mapping relation, to determine the coordinate position of the condition.

47. The method according to claim 45, wherein the mapping relation comprises an equation having a set of coefficients and a plurality of terms, each term being associated with at least one coefficient and optionally a mathematical function of at least one measured input value.

48. The method according to claim 45, wherein the mapping relation is derived from a set of empirical measurements, to account for an actual configuration of the surface and a configuration of a set of detectors through which the set of input values is detected.

49. The method according to claim 45, wherein the mapping relation directly maps the set of input values to corrected coordinate positions substantially without an intermediate representation of an uncorrected coordinate position.

50. The method according to claim 45, wherein the mapping relation comprises a polynomial equation, the polynomial equation comprising a sum of a plurality of selected product terms of coefficients and one or more detector outputs, the plurality of terms being selected such that a predetermined minimum accuracy is achieved with minimum computational complexity.

51. The method according to claim 45, wherein the mapping relation comprises a polynomial equation, the polynomial equation comprising a sum of a plurality of selected product terms of coefficients and one or more detector outputs, the plurality of terms being selected such that a predetermined minimum accuracy is achieved with a minimum number of coefficients.

* * * * *